United States Patent
Zehringer et al.

(10) Patent No.: US 10,670,482 B2
(45) Date of Patent: Jun. 2, 2020

(54) SENSOR ELEMENT FOR A PRESSURE SENSOR

(71) Applicant: Robert Bosch GmbH, Stuttgart (DE)

(72) Inventors: Stefan Zehringer, Reutlingen (DE); Zoltan Lestyan, Martonvasar (HU); Richard Fix, Weil im Schoenbuch (DE); Jochen Franz, Reutlingen (DE); Michaela Mitschke, Reutlingen (DE); Tobias Sebastian Frey, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 15/775,253

(22) PCT Filed: Oct. 14, 2016

(86) PCT No.: PCT/EP2016/074818
§ 371 (c)(1),
(2) Date: May 10, 2018

(87) PCT Pub. No.: WO2017/084819
PCT Pub. Date: May 26, 2017

(65) Prior Publication Data
US 2018/0328804 A1   Nov. 15, 2018

(30) Foreign Application Priority Data
Nov. 18, 2015   (DE) .......... 10 2015 222 756

(51) Int. Cl.
  *G01L 9/08*    (2006.01)
  *G01L 9/00*    (2006.01)
  *G01L 19/00*   (2006.01)

(52) U.S. Cl.
  CPC ............ *G01L 9/085* (2013.01); *G01L 9/0052* (2013.01); *G01L 19/0092* (2013.01)

(58) Field of Classification Search
  CPC .... G01L 9/085; G01L 19/0092; G01L 9/0052
  See application file for complete search history.

(56) References Cited

U.S. PATENT DOCUMENTS

| 4,173,148 A | 11/1979 | Yamada et al. |
| 4,538,466 A | 9/1985 | Kerber |

(Continued)

FOREIGN PATENT DOCUMENTS

| CN | 1651883 A | 8/2005 |
| CN | 100385218 C | 4/2008 |

(Continued)

OTHER PUBLICATIONS

International Search Report dated Jan. 18, 2017 of the corresponding International Application PCT/EP2016/074818 filed Oct. 14, 2016.

*Primary Examiner* — Freddie Kirkland, III
(74) *Attorney, Agent, or Firm* — Norton Rose Fulbright US LLP; Gerard Messina

(57) ABSTRACT

A sensor element for a pressure sensor, includes a sensor membrane on which a defined number of piezoresistors are situated, the piezoresistors being configured in a circuit in such a way that, when there is a change in pressure an electrical change in voltage can be generated; at least two temperature measuring elements configured in relation to the sensor membrane in such a way that temperatures of the sensor membrane at positions of the piezoresistors can be measured using the temperature measuring elements, an electrical voltage present at the circuit of the piezoresistors due to a temperature gradient being capable of being compensated computationally using the measured temperatures.

13 Claims, 3 Drawing Sheets

(56) References Cited

U.S. PATENT DOCUMENTS

| | | |
|---|---|---|
| 5,116,331 A | 5/1992 | Chapman |
| 6,247,369 B1 | 6/2001 | Chapman et al. |
| 6,698,294 B2 * | 3/2004 | Jacob .................... G01L 9/0075 73/708 |
| 7,456,638 B2 * | 11/2008 | Bhansali ............... G01C 13/008 324/446 |
| 9,534,974 B2 * | 1/2017 | Vaiana .................. G01L 9/0054 |
| 9,939,340 B2 * | 4/2018 | Novellani ........... G01L 19/0092 |
| 2002/0026835 A1 | 3/2002 | Jacob et al. |
| 2007/0113665 A1 | 5/2007 | Johnson |
| 2011/0133939 A1 * | 6/2011 | Ranganathan ....... A61B 5/0008 340/584 |
| 2013/0215931 A1 | 8/2013 | Vaiana et al. |
| 2015/0219514 A1 | 8/2015 | Novellani et al. |
| 2015/0268112 A1 | 9/2015 | Yajima |

FOREIGN PATENT DOCUMENTS

| | | |
|---|---|---|
| DE | 3736904 A1 | 5/1989 |
| DE | 19701055 A1 | 7/1998 |
| DE | 19825761 A1 | 12/1999 |
| DE | 102005029841 A1 | 3/2006 |
| DE | 102005017853 A1 | 10/2006 |
| DE | 102008041771 A1 | 3/2010 |
| DE | 102008054428 A1 | 6/2010 |
| DE | 102011080229 A1 | 2/2013 |
| DE | 102011084514 A1 | 4/2013 |
| EP | 2182340 A1 | 5/2010 |
| JP | S62229041 A | 10/1987 |
| JP | H03249532 A | 11/1991 |
| JP | H04328434 A | 11/1992 |
| JP | H06213745 A | 8/1994 |
| JP | H09329516 A | 12/1997 |
| JP | 2000515623 A | 11/2000 |
| JP | 2005539200 A | 12/2005 |
| JP | 2010091384 A | 4/2010 |
| JP | 2012058192 A | 3/2012 |
| WO | 95/03533 A2 | 2/1995 |
| WO | 2014002150 A1 | 1/2014 |

\* cited by examiner

SENSOR ELEMENT FOR A PRESSURE SENSOR

CROSS-REFERENCE TO RELATED APPLICATIONS

The present application is the national stage of International Pat. App. No. PCT/EP2016/074818 filed Oct. 14, 2016, and claims priority under 35 U.S.C. § 119 to DE 10 2015 222 756.1, filed in the Federal Republic of Germany on Nov. 18, 2015, the content of each of which are incorporated herein by reference in their entireties.

FIELD OF THE INVENTION

The present invention relates to a sensor element for a pressure sensor. The present invention further relates to a method for producing a sensor element for a pressure sensor.

BACKGROUND

Piezoresistive pressure sensors are, as a rule, made up of a sensor element (or sensor die) having a membrane. On this membrane there are situated for example four stress-sensitive piezoresistors connected to form an electrical bridge circuit.

When there is a temperature gradient over the sensor element, this means that the piezoresistors have different resistance values due to the different temperatures. This can cause a change in the electrical bridge voltage, due to a temperature gradient, that cannot be distinguished from a change in the electrical bridge voltage due to an applied pressure. Even a few millikelvins can cause a deviation in the electrical bridge voltage that corresponds to a few pascals of pressure change.

SUMMARY

An object of the present invention is to provide a sensor element for a pressure sensor that is improved with regard to temperature changes.

According to a first aspect, the object is achieved by a sensor element for a pressure sensor, the sensor element including: a sensor membrane on which a defined number of piezoresistors are situated, the piezoresistors being configured in a circuit such that when there is a change in pressure an electrical change in voltage can be generated; and at least two temperature measuring elements that are situated in relation to the sensor membrane in such a way that temperatures of the sensor membrane at positions of the piezoresistors can be measured using the temperature measuring elements, an electrical voltage present at the circuit of the piezoresistors due to a temperature gradient being capable of being compensated computationally using the measured temperatures.

In this way, it is advantageously possible, in devices having barometric pressure sensors (e.g., mobile telephones), to compensate for an influence of a temperature gradient on the pressure sensor. As a result, in this way a more precise pressure measurement is advantageously supported.

According to a second aspect, the object is achieved by a method for producing a sensor element for a pressure sensor, the method including the steps of: providing a sensor membrane; providing a defined number of piezoresistors and configuring the piezoresistors on the sensor membrane in a circuit in such a way that when there is a change in pressure an electrical change in voltage can be generated; and providing at least two temperature measuring elements and configuring the at least two temperature measuring elements in relation to the sensor membrane in such a way that temperatures of the sensor membrane at positions of the piezoresistors can be measured using the temperature measuring elements, an electrical voltage present at the circuit of the piezoresistors due to a temperature gradient being capable of being compensated computationally using the measured temperatures.

In an example embodiment, at least one temperature measurement element is situated on the sensor membrane.

In an example embodiment, at least one temperature measuring element is situated adjacent to the sensor membrane.

In an example embodiment, a temperature measuring element is situated in each corner region of the sensor membrane.

In an example embodiment, a temperature measuring element is situated on each piezoresistor at a defined distance.

In an example embodiment, two temperature measuring elements are situated essentially along a curve of a temperature gradient of the sensor membrane.

With the various mentioned configurations or criteria for the temperature measuring elements, which can also be suitably combined, the placement of the temperature measuring elements on the sensor element can be carried out in an application-specific manner, and the placement can in particular be a function of whether a temperature gradient prevailing on the sensor membrane is at least partly known. This is the case for example when an electronic evaluation circuit, whose heating characteristic behavior is generally known, is present on the sensor element. In this way, it is possible to ascertain temperature values of the sensor membrane at positions of the piezoresistors, thus supporting a good compensation effect.

In an example embodiment, the temperature measuring elements are diodes or piezoinsensitive resistors. In this way, various types of temperature measuring elements are provided that can advantageously be produced in a common process step with the piezoresistors. Advantageously, in this way a production process for the sensor element can be optimized.

In the following, the present invention is described in detail, with further features and advantages, on the basis of a plurality of Figures. All disclosed features form the subject matter of the present invention, regardless of their relations of dependence in the patent claims, and independent of their representation in the description and in the figures. Identical or functionally identical elements have identical reference characters. The figures are in particular intended to illustrate the essential principles of the present invention, and are not necessarily shown to scale.

Disclosed method features result analogously from corresponding disclosed device features, and vice versa. This means in particular that features, technical advantages, and embodiments relating to the method for producing the sensor element result analogously from corresponding embodiments, features, and advantages of the sensor element, and vice versa.

DETAILED DESCRIPTION

Example embodiments of the present invention facilitate compensation of differing resistance values of piezoresistors of a piezoresistive sensor element on the basis of an effect of a temperature gradient running over a sensor membrane of the sensor element. A temperature gradient of a few mK over the sensor membrane can cause a deviation of the electrical bridge voltage that corresponds to a few Pa, thus resulting in an imprecise pressure measurement.

Using at least two elements for temperature measurement (for example in the form of temperature-sensitive diodes, temperature-sensitive resistors, etc.), the temperature gradient over the sensor membrane or over the sensor element can be determined. With the knowledge of this temperature gradient, it is possible to compensate for the deviation of the electrical bridge voltage computationally using known methods.

Figure 1:
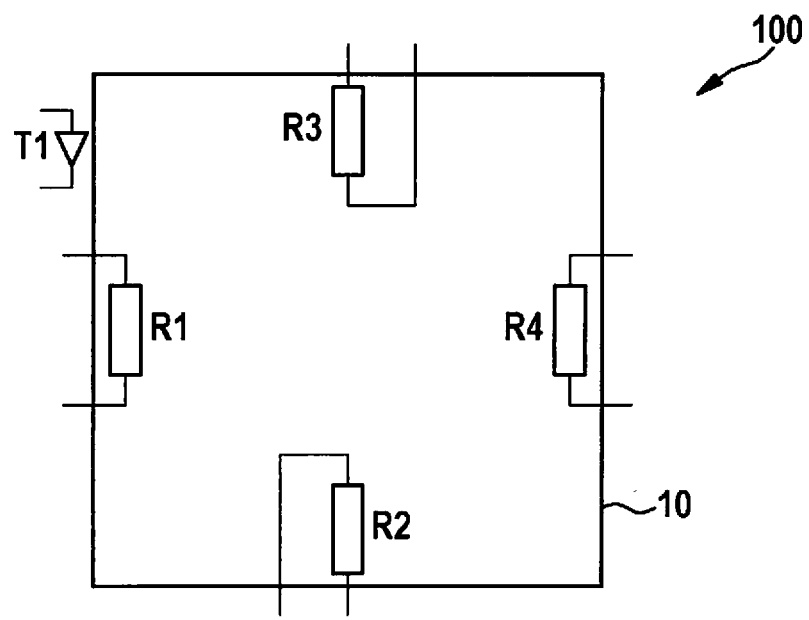
FIG. 1 shows a schematic representation of a conventional piezoresistive sensor element.

FIG. 1 schematically shows a conventional sensor element 100 having a sensor membrane 10, on which there are situated four piezosensitive resistors, or piezoresistors R1 . . . R4, a respective piezoresistor R1 . . . R4 being situated on a respective side segment of sensor membrane 10, and piezoresistors R1 . . . R4 being wired to one another electrically to form a bridge circuit (not shown). When there is a change of pressure (e.g., due to increased height above sea level) on the sensor membrane 10, this membrane deflects, causing mechanical stress at the location of piezoresistors R1 . . . R4. This causes a change in the resistance value of piezoresistors R1 . . . R4, and, given a suitable orientation or configuration of piezoresistors R1 . . . R4 on sensor membrane 10, a pressure-dependent electrical output voltage is generated that can be evaluated and that represents a measure for the pressure acting on sensor membrane 10.

However, conventional piezoresistors exhibit, not only mechanical stress dependence ("piezosensitivity"), but also a temperature dependence. In order to compensate for this undesirable temperature dependence, which is expressed as undesired changes in resistance, in piezoresistive pressure sensors there is frequently also a temperature sensor, or temperature measuring element T, on the sensor element. In the configuration of FIG. 1, the temperature sensor T is realized as a diode that is used to acquire a temperature of sensor element 100.

Figure 2:
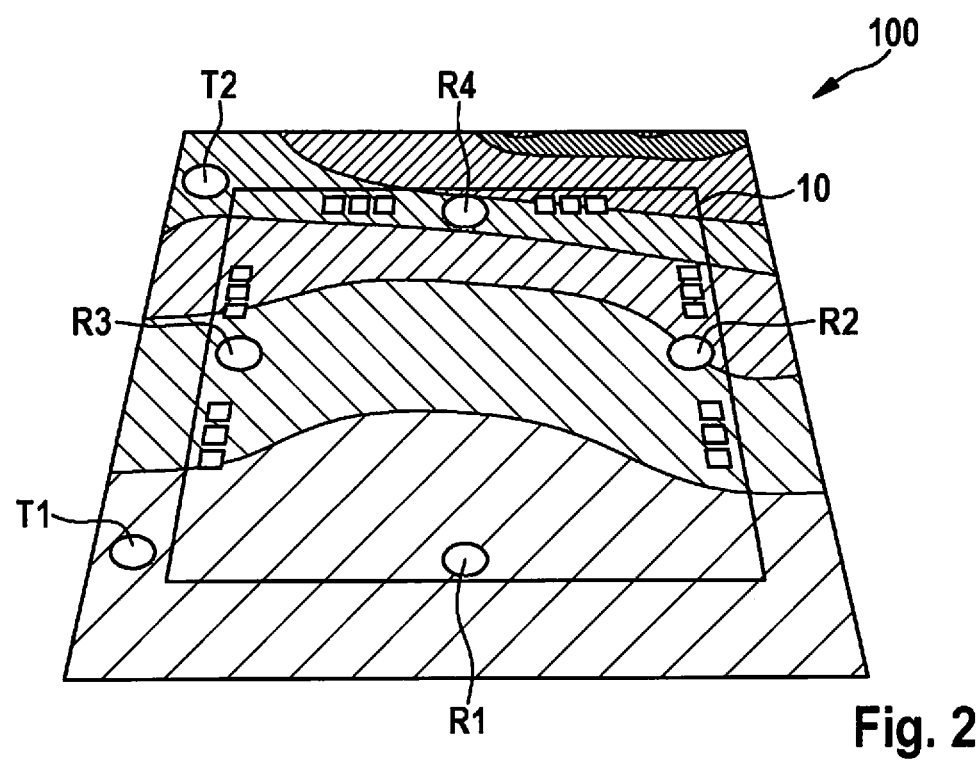
FIG. 2 shows a schematic representation of a sensor element according to an example embodiment of the present invention.

FIG. 2 shows a schematic representation of a sensor element 100 according to an example embodiment of the present invention. Visible are four piezoresistors R1 . . . R4, one piezoresistor R1 . . . R4 being situated respectively at each side segment of sensor membrane 10. Piezoelectric resistors R1 . . . R4 are wired electrically to one another in the form of a bridge circuit. Different hatchings indicate a temperature gradient running from top to bottom on sensor membrane 10. Two temperature measuring elements T1, T2, realized as diodes or as essentially piezoinsensitive or stress-insensitive resistors, are situated adjacent to sensor membrane 10 in such a way that they essentially completely pick up temperature gradients of sensor membrane 10. Using the two temperature measuring elements T1, T2, the temperature difference between the two temperature measuring elements T1, T2 is measured.

Temperature measuring elements or sensors T1, T2 are placed at locations outside, or directly adjacent to, sensor membrane 10, at which a temperature gradient is present or prevails that is similar to the one present over the entire sensor membrane 10. In other applications, it can be appropriate to place temperature measuring elements T1, T2 as close as possible to piezoresistors R1 . . . R4, so that in this way the temperatures at the positions of piezoresistors R1 . . . R4 of sensor membrane 10 can be measured as precisely as possible.

Figure 3:
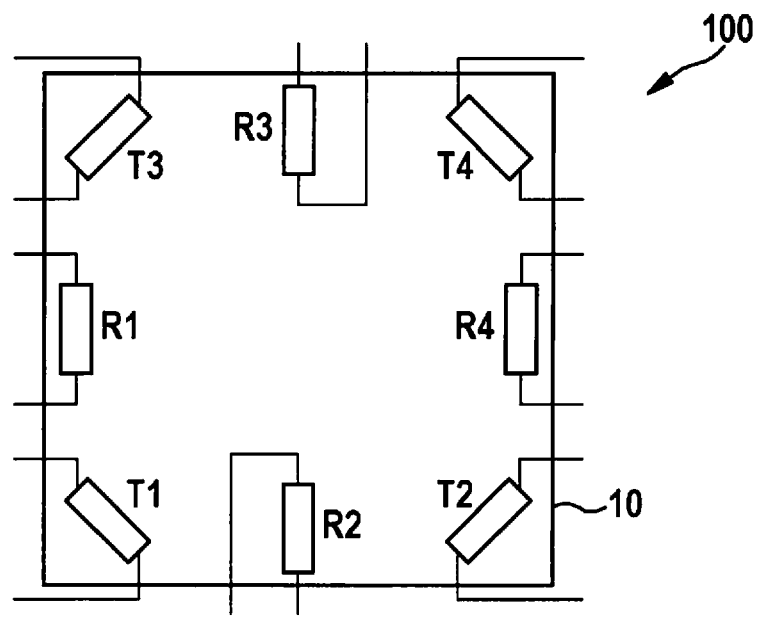
FIG. 3 shows a schematic representation of a sensor element according to an example embodiment of the present invention.

For the case in which, in an application, a temperature gradient is present between all four piezoresistors R1 . . . R4, then in a variant four or more temperature measuring elements T1 . . . Tn can also be placed on sensor element 100. Alternatively to a placement adjacent to sensor membrane 10, these can also be situated on sensor membrane 10, for example with a 45° orientation to side segments of sensor membrane 10, in order in this way to minimize a sensitivity to pressure, as in a variant, shown in FIG. 3, of sensor element 100 having piezoresistors R1 . . . R4 and temperature measuring elements T1 . . . T4.

If the temperature gradient between temperature measuring elements T1 . . . Tn is known, then in this way an electrical signal caused by the temperature gradient between piezoresistors R1 . . . R4 can be compensated. The compensation can for example take place using an electronic evaluation circuit (e.g. an ASIC; not shown), that processes the acquired temperature voltage in comparison with the electrical voltage of piezoresistors R1 . . . Rn. For example using a quadratic regression, the actual temperature difference between piezoresistors R1 . . . R4 can now be calculated.

Figure 4:
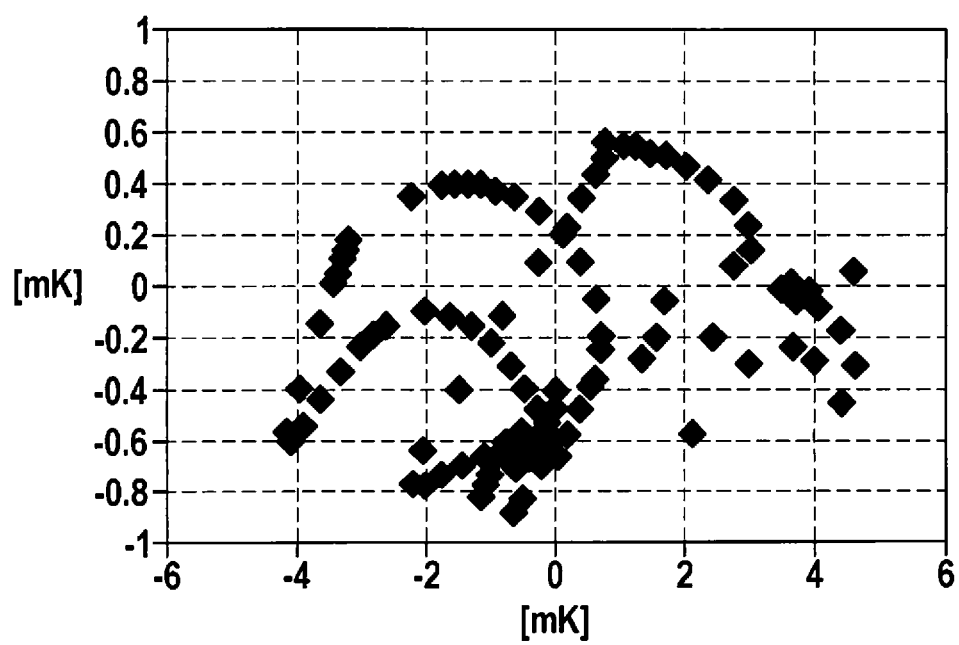
FIG. 4 illustrates a compensation effect that can be achieved using the temperature measuring elements, according to an example embodiment of the present invention.

An residual error existing for various process variations is shown in FIG. 4, over the temperature difference actually present between piezoresistors R1 and R4. On the X axis, the temperature gradient before the compensation is shown in mK, and on the Y axis the temperature gradient after the compensation is shown. The graph indicates that a residual error of approximately ±5 mK is reduced to approximately ±1 mK.

Figure 5:
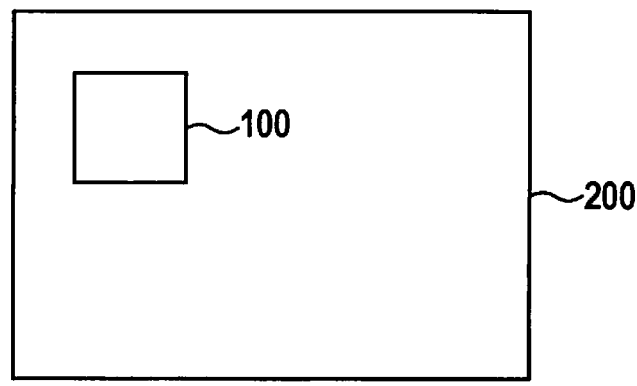
FIG. 5 shows a schematic representation of a sensor device including a sensor element according to an example embodiment of the present invention.

FIG. 5 shows a schematic diagram of a sensor device 200 having sensor element 100 according to an example embodiment of the present invention. Sensor device 200 can be realized as a so-called environmental sensor that represents a sensor module with which various environmental parameters can be acquired, such as temperature, air pressure, humidity, air quality, etc. With the configuration of sensor element 100, it is advantageously possible to eliminate the influence of temperature on the pressure measurement element to the greatest possible extent.

Figure 6:
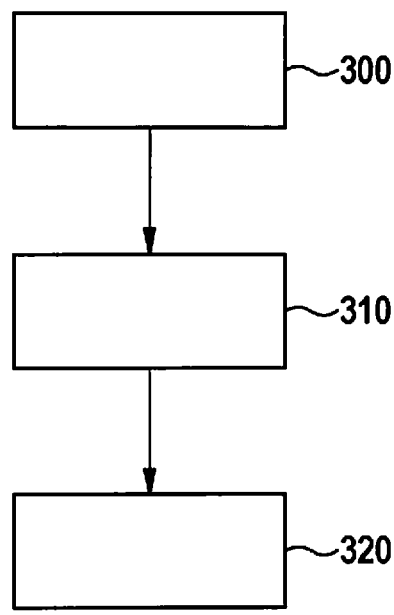
FIG. 6 is a flowchart that illustrates a method according to an example embodiment of the present invention.

FIG. 6 illustrates a method according to an example embodiment of the present invention. In a step 300, a sensor membrane 10 is provided. In a step 310, a defined number of piezoresistors R1 . . . Rn are provided that are configured on sensor membrane 10 in a circuit in such a way that when there is a change in pressure an electrical change in voltage can be generated. Finally, in a step 320 a provision is made of at least two temperature measuring elements T1 . . . Tn, and a configuration is made of the at least two temperature measuring elements T1 . . . Tn in relation to sensor membrane 10 such that temperatures of the sensor membrane 10 at positions of the piezoresistors can be measured using temperature measuring elements T1 . . . Tn, and an electrical voltage present at the circuit of piezoresistors R1 . . . Rn due to a temperature gradient can be computationally compensated using the measured temperatures.

It is to be noted that the method steps for producing sensor element 100 can also be carried out in different sequences.

In sum, the present invention provides a sensor element for a pressure sensor and a method for producing such a sensor element with which an influence of temperature on a piezoresistive pressure sensor can be eliminated or minimized to the greatest possible extent. Advantageously, with the proposed sensor element temperature influences of temperature gradients can be largely compensated, and in this way the precision of pressure measurement can be significantly increased.

As a result, in this way a more precise measurement of pressures is possible using a pressure sensor that has the sensor element. Advantageously, the temperature compensation is possible both when the temperature gradient is well-known (for example when a heating electronic component is present on the sensor) and in cases in which the temperature gradient is not known.

Through a suitable positioning of a suitable number of temperature measuring elements, the influence of the temperature gradient can be eliminated in application-specific fashion. Here, the number of temperature measurement elements can vary as a function of the degree of non-homogeneity of the temperature curve over the sensor membrane.

Of course, the present invention can also be used with other sensor elements having a similar design.

Although in the preceding the present invention has been described on the basis of concrete examples of use, a person skilled in the art will also be able to realize specific embodiments not disclosed, or only partly disclosed, without departing from the core of the present invention.

What is claimed is:

1. A sensor element for a pressure sensor, comprising:
a sensor membrane;
a plurality of piezoresistors situated on the sensor membrane and configured in a bridge circuit such that a change in pressure causes an electrical change in voltage; and
a plurality of temperature measuring elements configured in relation to the sensor membrane so that temperatures of the sensor membrane at respective positions of the piezoresistors are measurable using the temperature measuring elements;
wherein the sensor element is configured to determine a temperature gradient over the sensor membrane based on output of the temperature measuring elements and, based on the determined temperature gradient, computationally compensate for a deviation of an electrical bridge voltage of the bridge circuit that is present due to the temperature gradient,
wherein a number of the piezoresistors and the temperature measuring elements is the same, and
wherein the temperature measuring elements are situated on the sensor membrane with an angled orientation to side segments of the sensor membrane, so as to minimize a sensitivity to pressure.

2. The sensor element as of claim 1, wherein at least one of the temperature measuring elements is situated on the sensor membrane.

3. The sensor element of claim 1, wherein at least one of the temperature measuring elements is situated adjacent to the sensor membrane.

4. The sensor element of claim 1, wherein at least one of the temperature measuring elements is situated at each of a plurality of corner regions of the sensor membrane.

5. The sensor element of claim 4, wherein a respective one of the temperature measuring elements is situated at a defined distance from each of the piezoresistors.

6. The sensor element of claim 1, wherein the temperature gradient is a curved line, and wherein the temperature measuring elements are situated along the curved line of the temperature gradient.

7. The sensor element of claim 1, wherein the temperature measuring elements include temperature-sensitive diodes.

8. The sensor element of claim 1, wherein the temperature measuring elements include temperature-sensitive resistors.

9. A method for producing a sensor element for a pressure sensor, the method comprising:
arranging a plurality of piezoresistors on a sensor membrane in a bridge circuit such that a change in pressure causes an electrical change in voltage; and
arranging a plurality of temperature measuring elements relative to the sensor membrane so that temperatures of the sensor membrane at respective positions of the piezoresistors are measurable using the temperature measuring elements;
wherein the sensor element is configured to determine a temperature gradient over the sensor membrane based on output of the temperature measuring elements and, based on the determined temperature gradient, computationally compensate for a deviation of an electrical bridge voltage of the bridge circuit that is present due to the temperature gradient,
wherein a number of the piezoresistors and the temperature measuring elements is the same, and
wherein the temperature measuring elements are situated on the sensor membrane with an angled orientation to side segments of the sensor membrane, so as to minimize a sensitivity to pressure.

10. The method of claim 9, wherein the temperature measuring elements include temperature-sensitive diodes or temperature-sensitive resistors.

11. The method of claim 9, wherein the temperature measuring elements are situated on the sensor membrane or adjacent to the sensor membrane such that temperatures can be measured at positions of the piezoresistors using the temperature measuring elements.

12. The method of claim 9, wherein the angled orientation has an angle of about 45 degrees.

13. The sensor element of claim 9, wherein the angled orientation has an angle of about 45 degrees.

* * * * *